(12) United States Patent
Li et al.

(10) Patent No.: US 12,032,572 B2
(45) Date of Patent: Jul. 9, 2024

(54) MICROSERVICE COMPONENT-BASED DATABASE SYSTEM AND RELATED METHOD

(71) Applicant: HUAWEI TECHNOLOGIES CO., LTD., Guangdong (CN)

(72) Inventors: Guoliang Li, Beijing (CN); Sihao Li, Shenzhen (CN); Jinyu Zhang, Beijing (CN); Yahui Dong, Beijing (CN); Pinggao Zhou, Beijing (CN); Shifu Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 162 days.

(21) Appl. No.: 17/525,400

(22) Filed: Nov. 12, 2021

(65) Prior Publication Data

US 2022/0067044 A1 Mar. 3, 2022

Related U.S. Application Data

(63) Continuation of application No. PCT/CN2020/087732, filed on Apr. 29, 2020.

(30) Foreign Application Priority Data

May 14, 2019 (CN) .......................... 201910399731.0

(51) Int. Cl.
*G06F 16/2453* (2019.01)
*G06F 11/14* (2006.01)
(Continued)

(52) U.S. Cl.
CPC .... *G06F 16/24542* (2019.01); *G06F 11/1423* (2013.01); *G06F 11/3433* (2013.01); *G06F 16/2455* (2019.01); *G06F 16/256* (2019.01)

(58) Field of Classification Search
None
See application file for complete search history.

(56) References Cited

U.S. PATENT DOCUMENTS 10,853,159 B1 * 12/2020 Langley .............. G06F 11/3034
2011/0228668 A1 9/2011 Pillai et al.
(Continued)

FOREIGN PATENT DOCUMENTS

| CN | 105959138 A | 9/2016 |
|---|---|---|
| CN | 107612959 A | 1/2018 |

(Continued)

OTHER PUBLICATIONS

Office Action issued in Chinese Application No. 201910399731.0 on Dec. 13, 2021, 16 pages (with English translation).

(Continued)

*Primary Examiner* — Christopher J Raab
(74) *Attorney, Agent, or Firm* — Fish & Richardson P.C.

(57) ABSTRACT

Some embodiments provide a microservice component-based database system, to split a database kernel into microservice components that can be enabled and run independently and whose functions are decoupled, and implement flexible database assembly and management. The microservice component can be deployed based on a system resource and a service form. The components can collaborate with each other by using a lightweight communication mechanism. A component manager provides capabilities such as registration and deregistration of a service component, component resource management, component fault tolerance, and component upgrade, to implement dynamic management of the component in a running environment. A job scheduler selects, based on a job submitted by a user, an optimal execution path including a plurality of components, and performs resource management and scheduling in a job (Continued)

execution process, to implement load balancing and high availability.

17 Claims, 13 Drawing Sheets

(51) Int. Cl.
*G06F 11/34* (2006.01)
*G06F 16/2455* (2019.01)
*G06F 16/25* (2019.01)

(56) References Cited

U.S. PATENT DOCUMENTS

| | | | |
|---|---|---|---|
| 2014/0188841 A1 | 7/2014 | Sun et al. | |
| 2016/0337278 A1 | 11/2016 | Peruri et al. | |
| 2018/0089267 A1* | 3/2018 | Hatem | G06F 16/2455 |
| 2018/0321996 A1 | 11/2018 | Riva et al. | |
| 2019/0095241 A1 | 3/2019 | Ago et al. | |
| 2021/0026646 A1* | 1/2021 | Jha | G06F 9/3891 |
| 2021/0133015 A1* | 5/2021 | Agarwal | G06F 11/36 |
| 2022/0027361 A1* | 1/2022 | Yamato, II | G06F 16/2455 |
| 2022/0067044 A1* | 3/2022 | Li | G06F 11/1423 |

FOREIGN PATENT DOCUMENTS

| | | |
|---|---|---|
| CN | 108664378 A | 10/2018 |
| CN | 108768716 A | 11/2018 |
| CN | 109144660 A | 1/2019 |

OTHER PUBLICATIONS

PCT International Search Report and Written Opinion issued in International Application No. PCT/CN2020/087732 on Aug. 5, 2020, 15 pages (with English translation).

Extended European Search Report issued in European Application No. 20806640.7 on May 23, 2022, 9 pages.

* cited by examiner

MICROSERVICE COMPONENT-BASED DATABASE SYSTEM AND RELATED METHOD

CROSS-REFERENCE TO RELATED APPLICATIONS

This application is a continuation of International Application No. PCT/CN2020/087732, filed on Apr. 29, 2020, which claims priority to Chinese Patent Application No. 201910399731.0, filed on May 14, 2019. The disclosures of the aforementioned applications are hereby incorporated by reference in their entireties.

TECHNICAL FIELD

This application relates to the database field, and more specifically, to a microservice component-based database system and a related method.

BACKGROUND

A database system is a core of many application systems, and is used to provide an application with capabilities such as a data operation, permission control, data durability, concurrency control, and crash recovery. A conventional database system architecture is designed for a general purpose processor. Core components include a structured query language (structured query language, SQL) parser, an SQL optimizer, an SQL executor, and a storage engine. The conventional database system is divided into functional components in a logical architecture, but is physically implemented through tight coupling. To be specific, the database system is developed as a whole and deployed on a specific hardware device, to implement a data maintenance and management function. Such a tight coupling implementation has played a significant role in a single hardware and application environment in the past few decades. However, in the face of endless emergence of new hardware layers, increasing prevalence of a heterogeneous environment, and a higher requirement of a user for availability and flexibility of the database system, more problems of a tightly coupled database architecture are exposed, and mainly include the following aspects:

(1) The system has low resilience. If a fault occurs in a functional module, the availability of the system may be affected.

(2) There are high software development, validation, and maintenance costs. Because the architecture is not clearly layered, no interface is strictly defined for interaction between components, global variables are used in disorder, short-circuit invocation is common, and formal verification is difficult, it is difficult to maintain and upgrade tight coupling over time.

(3) Machines with different configurations have low resource utilization. For example, when resources such as an ARM® or X86 processor, a memory, a graphics processing unit (graphics processing unit, GPU), an accelerator card, and a storage medium are configured differently for different machines, differentiated configuration cannot be performed on the different machines in an existing database architecture. Consequently, hardware cannot fully use respective performance advantages.

SUMMARY

This application provides a microservice component-based self-assembly database system and a related method. A microservice componentized database kernel architecture is used, to build a heterogeneous database system by fully using a difference between a hardware platform and user load, and implement efficient resource utilization and flexible system assembly.

According to a first aspect, an embodiment of this application provides a database system, including a plurality of computing nodes, a job manager, a component manager, and a plurality of database microservice components deployed on the plurality of computing nodes. At least one microservice component is deployed on each computing node, and each microservice component is configured to implement a subfunction of a database management system. The component manager is configured to determine at least one execution path. The execution path indicates a plurality of microservice components that are to be executed sequentially. The job manager is configured to: receive a query submitted by a client; invoke the plurality of microservice components in response to the query based on the execution path determined by the component manager, to process the query to obtain a query result; and return the processing result to the client. In the solution of this embodiment of this application, a kernel of the database management system is split into microservice components that can be enabled and run independently and whose functions are decoupled, to implement flexible database assembly and management. The microservice component is deployed based on a system resource and a service form. The components can collaborate with each other by using a lightweight communication mechanism. A job scheduler selects, based on a job submitted by a user, an optimal execution path including a plurality of components, and performs resource management and scheduling in a job execution process, to implement load balancing and high availability.

In a possible implementation, the component manager is further configured to maintain metadata of the microservice component, and the metadata includes information about a currently available microservice component in the database system and a deployment location of each microservice component.

In a possible implementation, a new microservice component may be registered with the component manager. For example, a registration request is sent to the component manager, to complete component registration. Correspondingly, the component manager updates, based on the component registration request, metadata maintained by the component manager, to further implement registration and dynamic management of a service component.

In a possible implementation, the plurality of microservice components include at least two of a parser service, an optimizer service, an executor service, a storage engine service, a metadata service, a statistics service, a self-monitoring service, and a clock service.

In a possible implementation, the plurality of microservice components may be combined to implement a function of one database management system.

In a possible implementation, the plurality of microservice components include a parser and optimizer combination service, an executor service, and a storage engine service.

In a possible implementation, the database system may include a plurality of microservice components having a same function or a substantially same function. However, in a specific implementation, there are a plurality of different microservice components, for example, a plurality of types of storage engines.

In a possible implementation, the database system includes a plurality of job managers, for example, three job managers. The plurality of job managers may be executed concurrently, thereby preventing the job managers from becoming a system bottleneck.

In a possible implementation, the plurality of computing nodes communicate with each other through a high-speed network, for example, an InfiniBand (InfiniBand) network or a remote direct memory access (remote direct memory access, RDMA) network. InfiniBand is a computer network communications standard for high-performance computing. InfiniBand has a very high throughput and a very low latency, to meet a low latency requirement of cross-node communication between microservice components.

In a possible implementation, the computing node is a physical machine that has a hardware resource.

In a possible implementation, a virtual machine or a container runs on the computing node, one microservice component may be deployed on one virtual machine or container, or a plurality of microservice components may be deployed on a same virtual machine or container.

In a possible implementation, one microservice component runs on an independent process, thread, or instance in a virtual machine or container.

In a possible implementation, the microservice component may be stored in a memory in a form of a dynamic link library, and dynamically loaded and executed at a specific time.

In a possible implementation, the at least one execution path includes an optimal execution path and an alternative execution path, and the job manager is specifically configured to: invoke the plurality of microservice components based on the optimal execution path to process the query, and when an error occurs in a microservice component on the optimal execution path, invoke the plurality of microservice components based on the alternative execution path, to process the query to obtain a query result. Fault tolerance is performed in such a multipath execution manner, thereby achieving high availability of the system.

In a possible implementation, the component manager is further configured to: initiate a backup of a first microservice component on an idle computing node if determining that load of the first microservice component in the database system exceeds a specified threshold, and generate a new execution path. The new execution path includes the backup of the first microservice component, and the first microservice component has a same function as the backup of the first microservice component.

According to a second aspect, an embodiment of this application provides a method for providing a database service, including: deploying a plurality of microservice components on a plurality of computing nodes, where at least one microservice component is deployed on each computing node, and each microservice component is configured to implement a subfunction of a database management system; determining at least one execution path, where each execution path indicates a plurality of microservice components that are to be executed sequentially; receiving a query submitted by a client, and invoking the plurality of microservice components in response to the query based on the determined at least one execution path, to process the query to obtain a query result; and returning the processing result to the client.

In a possible implementation, the method further includes: updating metadata of the microservice component in response to a component registration request, where the metadata includes information about a currently available microservice component in a database system and a deployment location of each microservice component.

In a possible implementation, the plurality of microservice components include at least two of a parser service, an optimizer service, an executor service, a storage engine service, a metadata service, a statistics service, a self-monitoring service, and a clock service.

In a possible implementation, the plurality of microservice components may be combined to implement a function of one database management system.

In a possible implementation, the plurality of microservice components include a parser and optimizer combination service, an executor service, and a storage engine service.

In a possible implementation, the database system may include a plurality of microservice components having a same function or a substantially same function. However, in a specific implementation, there are a plurality of different microservice components, for example, a plurality of types of storage engines.

In a possible implementation, the database system includes a plurality of job managers, for example, three job managers. The plurality of job managers may be executed concurrently, thereby preventing the job managers from becoming a system bottleneck.

In a possible implementation, the plurality of computing nodes communicate with each other by using a high-speed network, for example, an InfiniBand network or an RDMA network.

In a possible implementation, the computing node is a physical machine that has a hardware resource.

In a possible implementation, a virtual machine or a container runs on the computing node, one microservice component may be deployed on one virtual machine or container, or a plurality of microservice components may be deployed on a same virtual machine or container.

In a possible implementation, one microservice component runs on an independent process, thread, or instance in a virtual machine or container.

In a possible implementation, the microservice component may be stored in a memory in a form of a dynamic link library, and dynamically loaded and executed at a specific time.

In a possible implementation, the at least one execution path includes a first execution path and a second execution path, and the invoking the plurality of microservice components based on the determined at least one execution path to process the query includes: invoking the plurality of microservice components based on the first execution path to process the query; and when an error occurs in a microservice component in the first execution path, invoking the plurality of microservice components based on the second execution path, to process the query to obtain a query result.

In a possible implementation, the method further includes: initiating a backup of a first microservice component on an idle computing node if determining that load of the first microservice component in the plurality of microservice components exceeds a specified threshold, and generating a new execution path, where the new execution path includes the backup of the first microservice component, and the first microservice component has a same function as the backup of the first microservice component.

According to a third aspect, an embodiment of this application provides a database system, including one or more functional units configured to perform the method according to the first aspect or any implementation of the first aspect. The functional unit may be implemented by using a software module, or may be implemented by using hardware such as a processor, or may be implemented by combining a software and necessary hardware.

According to a fourth aspect, an embodiment of this application provides a device, including a memory, a processor, and a computer program stored in the memory. When executing the computer program, the processor implements steps of the method according to the first aspect or any implementation of the first aspect.

According to a fifth aspect, an embodiment of this application provides a computer-readable storage medium. The computer-readable storage medium stores a computer program (instructions). When the program (instructions) is executed by a processor, steps of the method according to the first aspect or any implementation of the first aspect is implemented.

BRIEF DESCRIPTION OF DRAWINGS

To describe the technical solutions in the embodiments of this application more clearly, the following briefly describes the accompanying drawings required for describing the embodiments in this application.

DESCRIPTION OF EMBODIMENTS

The following describes the technical solutions in the embodiments of this application with reference to the accompanying drawings in the embodiments of this application. It is clearly that the described embodiments are merely some rather than all of the embodiments of this application.

"A plurality of" in the embodiments of this application means two or more than two. In addition, it should be understood that in the descriptions of this application, terms such as "first" and "second" are merely used for distinguishing between descriptions, but should not be understood as indicating or implying relative importance, or should not be understood as indicating or implying a sequence.

Figure 1:
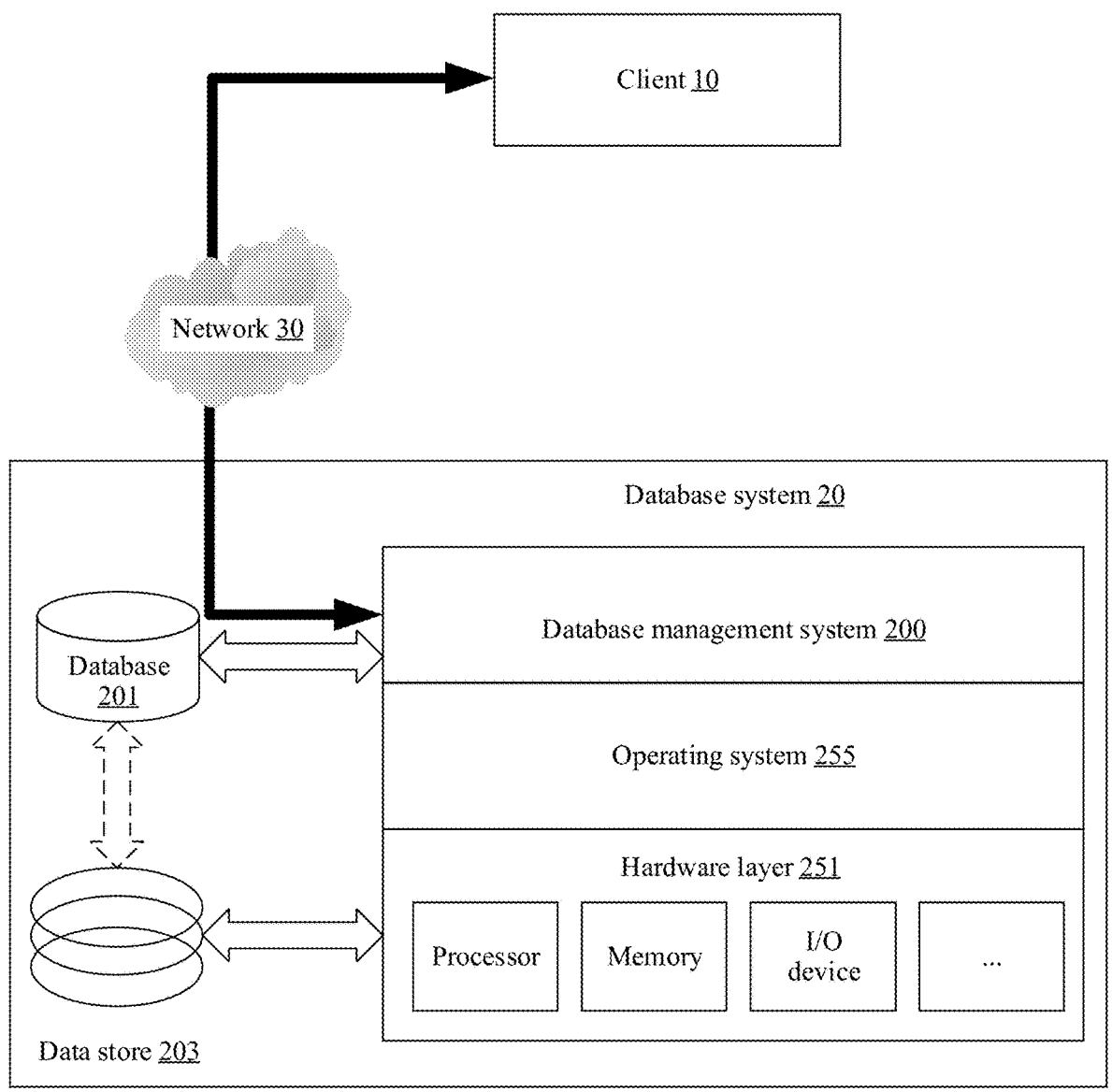
FIG. 1 is a schematic diagram of an architecture of a database system according to an embodiment of this application.

A method provided in the embodiments of this application may be applied to a database system (database system). FIG. 1 shows an architecture of a database system according to an embodiment of this application. In FIG. 1, a database system 20 includes a database 201, a data store (data store) 203, and a database management system (database management system, DBMS) 200.

The database 201 is a set of organized data stored in the data store 203, namely, a set of associated data organized, stored, and used based on a specific data model. According to different data models used for organizing data, the data may be classified into a plurality of types, for example, relational data (relational data), graph (graph) data, and time series (time series) data. The relational data is data for modeling by using a relational model, and is usually represented as a table, and a row of the table represents a set of related values of an object or entity. The graph data, referred to as a "graph", is used to represent a relationship between objects or entities, for example, a social relationship. The time series data, referred to as time series data, is a column of data recorded and indexed in time order, and is used to describe status change information of an object in a time dimension.

The database management system 200 is a core of the database system, and is system software for organizing, storing, and maintaining data. A client 10 may establish a communication connection with the database management system 200 through a network 30, and may access the database 201 by using the database management system 200. A database administrator (database administrator, DBA) also maintains the database 201 by using the database management system 200. The database management system 200 provides a plurality of functions, so that the client 10 establishes, modifies, or queries the database 201. The client 10 may be an application or user equipment. The functions provided by the database management system 200 may include but are not limited to the following: (1) Data definition function: The database management system 200 provides a data definition language (data definition language, DDL) to define a structure of the database 201. The DDL is used to describe a database framework, and can be stored in a data dictionary. (2) Data access function: The database management system 200 provides a data manipulation language (data manipulation language, DML), to implement a basic access operation on the database 201, for example, retrieval, insertion, modification, and deletion. (3) Database running management function: The database management system 200 provides a data control function to effectively control and manage running of the database 201, to ensure correct and effective data. (4) Database establishment and maintenance function, including functions such as loading initial data into the database, dumping, restoring, and re-organizing the database, and monitoring and analyzing system performance. (5) Database transmission: The database management system 200 provides processed data transmission to implement communication between the client 10 and the database management system 200, usually in coordination with an operating system.

Running of the database management system 200 depends on a necessary hardware and software environment, including but not limited to a hardware layer 251 and an operating system 255. The hardware layer 251 includes basic hardware units required for running of the operating system 255 and the database management system 200, for example, a processor, a memory (memory), an input/output (I/O) device, and a network interface controller (network interface controller, NIC). The operating system 255 is system software for managing a hardware unit, and may provide functions such as memory management and thread scheduling.

The data store 203 may be a non-transitory computer readable storage medium such as a hard disk, a disk, a storage array, a storage server, a cloud storage, or a storage area network (storage area network, SAN), and is communicatively connected to a computing node on which the hardware layer 251 is located. Alternatively, the data store 203 may be integrated into the computing node on which the hardware layer 251 is located, and exchange data with the processor and the I/O device through a bus or in another internal communication manner. It should be noted that the "computing node" in the embodiments of this application is an entity that has a hardware resource required for performing data calculation and/or storage, for example, a physical machine or a database server, or an entity that can invoke a hardware resource to perform calculation and/or storage, for example, a virtual machine (virtual machine, VM) or a container deployed on a physical machine.

In an embodiment, the functions of the database management system 200 may be implemented by the processor executing executable code stored in the memory. It should be understood that in various embodiments of the present invention, an "executable program" should be widely construed as including but not limited to an instruction, an instruction set, code, a code segment, a subroutine, a software module, an application, a software package, a thread, a process, a function, firmware, middleware, and the like.

A person skilled in the art may understand that the database system may include more or fewer components than those shown in FIG. 1, or include components different from those shown in FIG. 1. FIG. 1 merely show components more related to implementations disclosed in the embodiments of the present invention.

Figure 2:
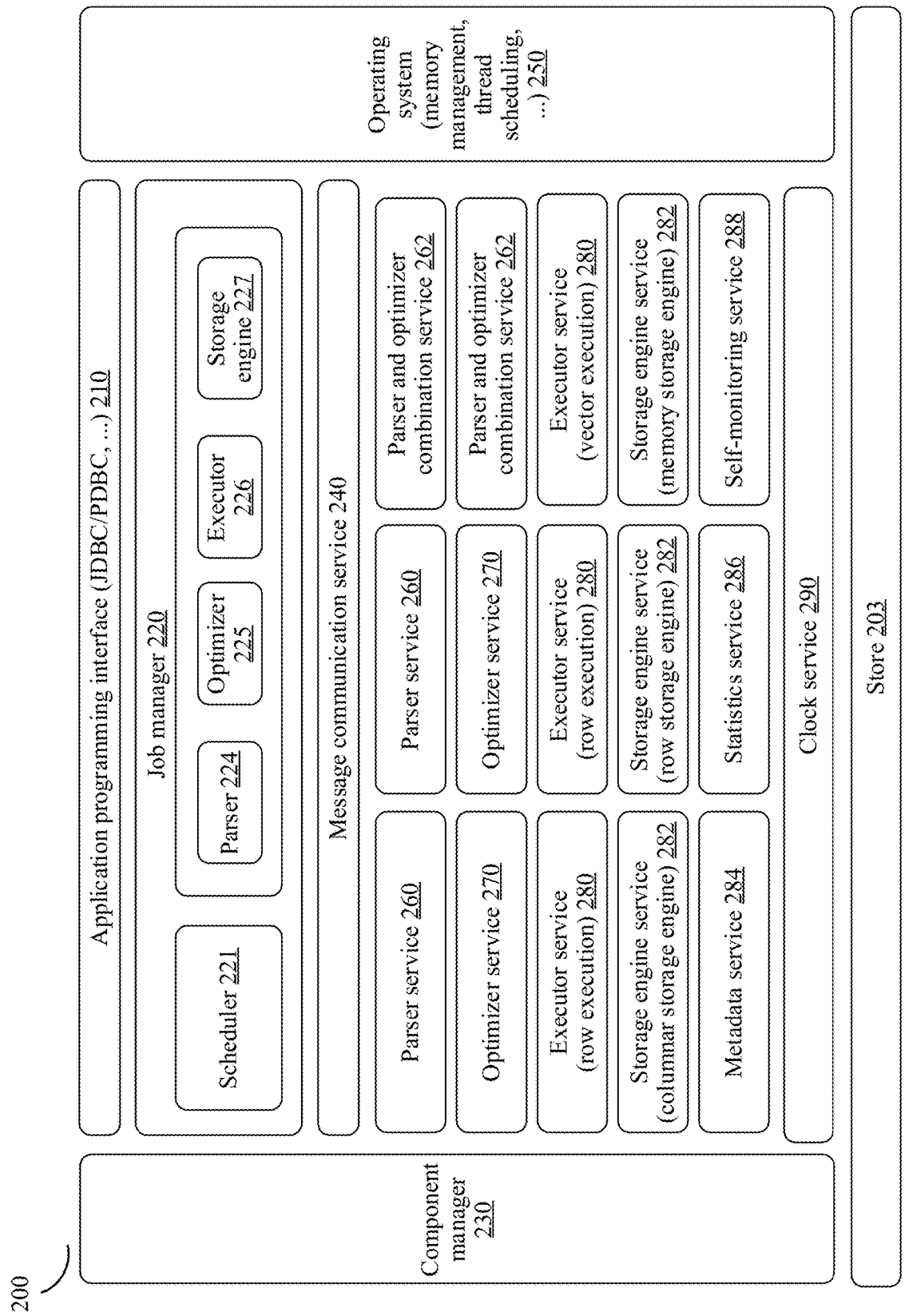
FIG. 2 is a schematic diagram of a logical architecture of a database management system according to an embodiment of this application.

FIG. 2 shows a logical architecture of a database management system 200 according to an embodiment of this application. In FIG. 2, the database management system 200 provides a series of microservice components whose functions are decoupled, including but not limited to a parser service 260, an optimizer service 270, an executor service 280, a storage engine service 282, a metadata service 284, a statistics service 286, a self-monitoring service 288, and a clock service 290. Each function corresponds to one or more microservice components. For example, two parser services, two optimizer services, three executor services, and three storage services are shown in the figure, and there is one metadata service, one statistics service, and one accelerator service. The database management system 200 may also include a plurality of types of microservice components having a same function. A storage service 280 is used as an example. FIG. 2 shows three types of storage engines: a columnar storage engine, a row storage engine, and a memory engine. For another example, the database management system 200 may simultaneously include a plurality of types of parser service components such as a parser for parsing a relational query, a parser for parsing a graph query, and a parser for parsing a time series query. There may be one or more microservice components of each type. The database management system 200 may flexibly schedule different microservice components based on a type of a query submitted by a client and system load, to respond to the query submitted by the client. A function of each microservice component is further described below.

A main function of the parser service (parser service) 260 is to perform lexical analysis, syntax analysis, and semantic analysis on an input SQL statement, and output a query parsing tree.

A main function of the optimizer service (optimizer service) 270 is to process an input query parsing tree and generate an execution plan. Processing logic of the optimizer service 270 includes query rewriting, path generation, cost model evaluation, optimal path selection, and execution plan tree generation.

The executor service (executor service) 280 is responsible for reading data from a storage engine, processing the data based on an execution plan, and returning the data to the client.

A main function of the storage engine service (storage engine service) 282 is to ensure durable storage of data, provide an efficient data access capability, and implement atomicity, consistency, isolation, and durability (atomicity, consistency, isolation, durability, ACID) capabilities of a database.

The metadata service (metadata service) 284 mainly provides durable storage of metadata and an efficient metadata access capability.

The statistics service (statistics service) 286 is mainly responsible for collecting and storing statistical information of a table, mainly including a quantity of pages of the table, a quantity of rows, value distribution information of each column, and the like.

The self-monitoring service (self-monitoring service) monitors various status data of the database, for example, hardware resource use information (a CPU, an I/O device, a memory, and a network) and a key performance indicator (key performance indicator, KPI) of each service component of the database.

The clock service (clock service) 290 provides unique and incremental timestamps, and an error is usually less than 100 ns.

Each microservice component can be enabled and run independently. For example, each microservice component may run as one or more instances, and an instance herein may be a thread. The service components communicate with each other by using a lightweight communication mechanism. In an embodiment, a plurality of microservice components may also be combined into a combination service component at a greater granularity. For example, a parser and optimizer combination service 262 shown in FIG. 2 is a combination service component including both a parser service function and an optimizer service function.

Figure 3:
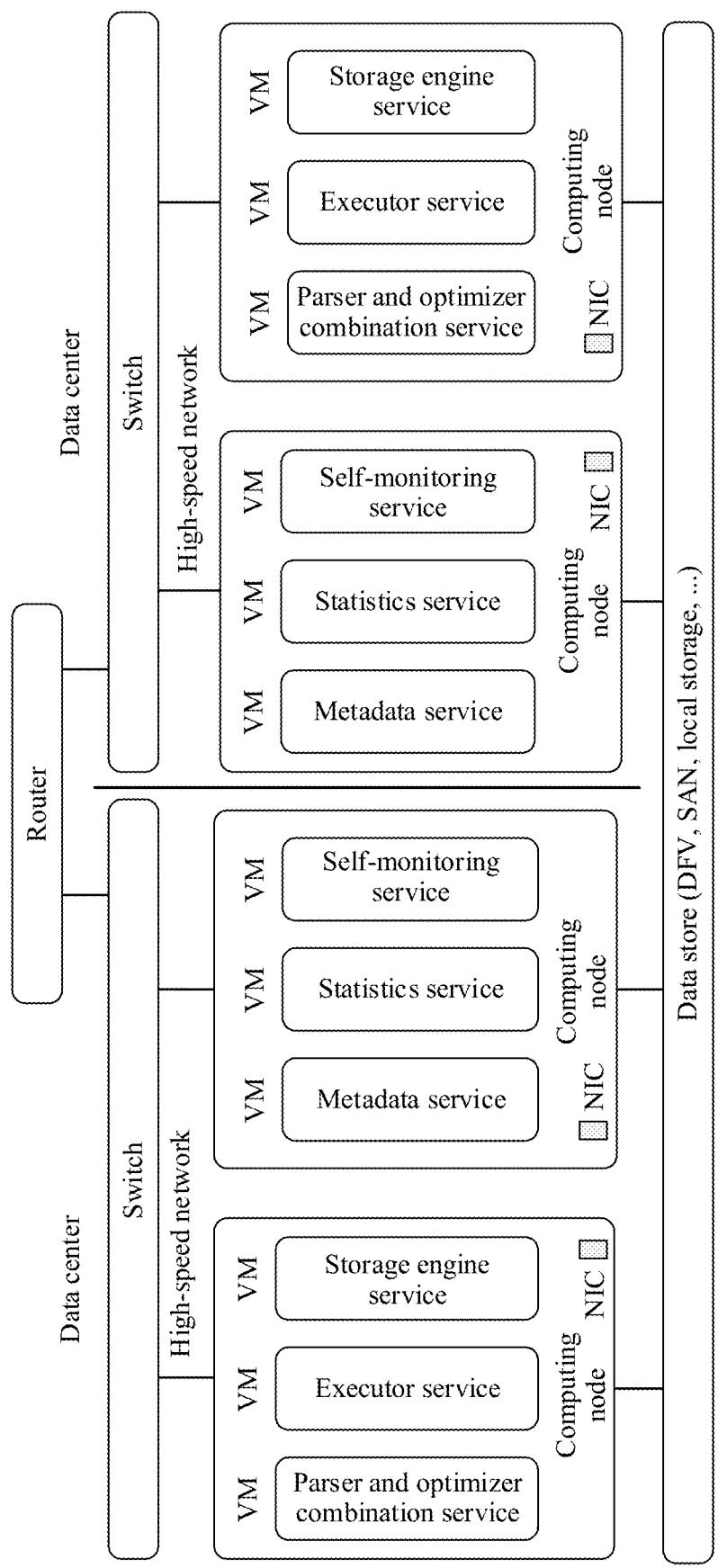
FIG. 3 is a schematic diagram of deployment of a database microservice component according to an embodiment of this application.

The microservice component can be independently deployed on a bare metal or in a container and can be upgraded online. A user or database kernel may flexibly configure and assemble microservice components based on a current service scenario, to build different types of database management systems. In an embodiment, as shown in FIG. 3, the microservice components of the database management system 200 may be deployed on computing nodes in a data center in a distributed manner, or deployed across data centers. The computing nodes in the data center are interconnected through a high-speed network, for example, interconnected through an InfiniBand (InfiniBand) network. The computing node is a physical machine or another device that has a data processing capability. Each computing node includes a basic hardware resource required for running of an operating system and an application, for example, a processor, a memory (memory), and an input/output (I/O) device. One or more virtual machines (virtual machines, VMs) run on one computing node, and one or more microservice components may be deployed on each VM. Although in FIG. 3, each microservice component is deployed on one independent VM, it should be understood that a plurality of microservice components may alternatively be deployed on a same VM.

Figure 4:
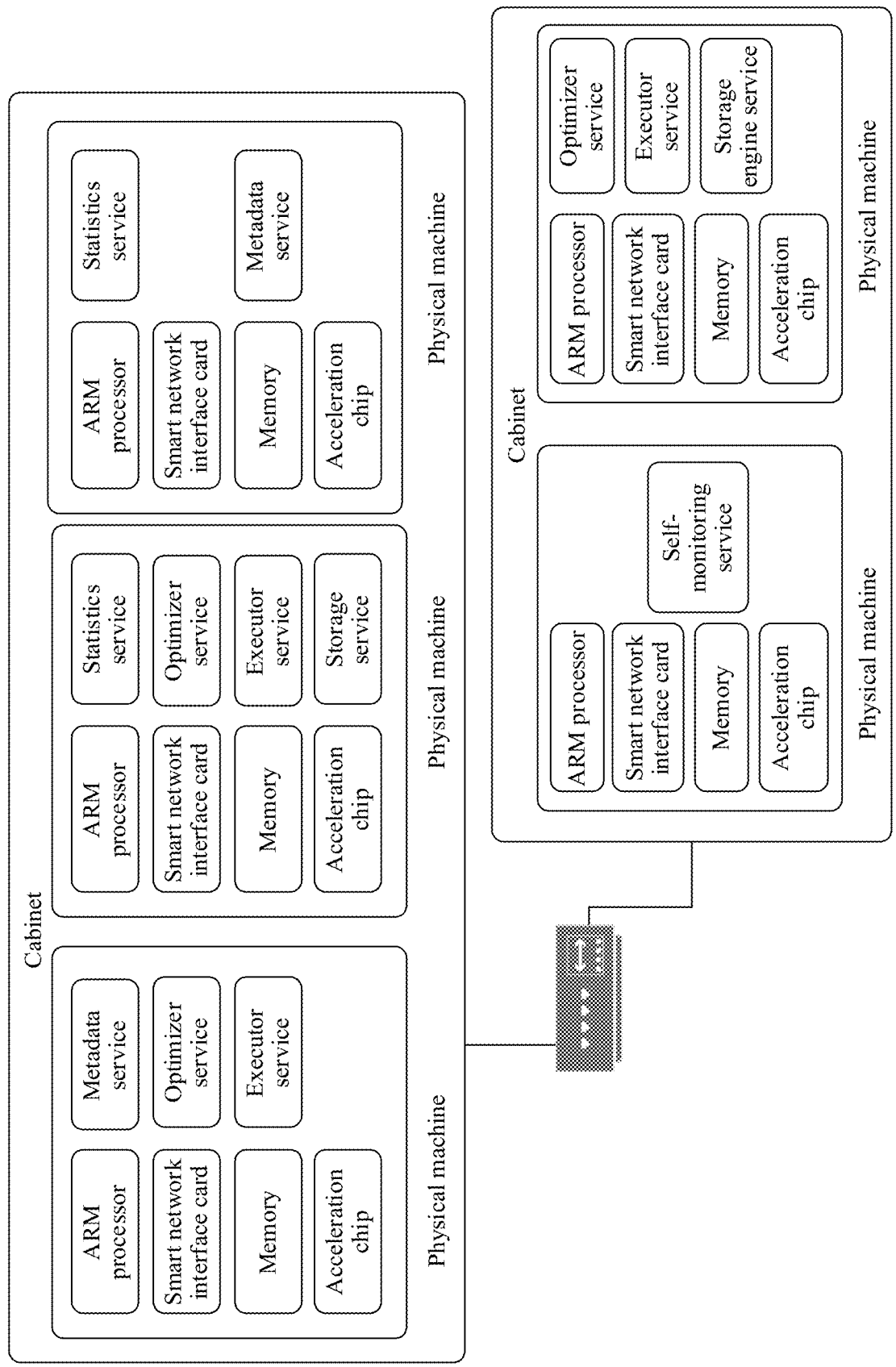
FIG. 4 is a schematic diagram of deployment of a database microservice component according to an embodiment of this application.

In another embodiment, the microservice component of the database management system 200 may also be deployed in a form of an all-in-one machine. As shown in FIG. 4, one or more microservice components are deployed on each physical machine, and a plurality of physical machines may be integrated into one cabinet, and communicate through a bus, for example, a PCI-E bus.

Further, as shown in FIG. 2, the database management system 200 further includes an application programming interface (API) 210, a job manager (job manager) 220, a component manager (component manager) 230, and a message communication service 240. The application programming interface 210 is an interface provided for a client to connect to and access the database management system 200, for example, a Java database connectivity (Java database connectivity, JDBC) interface, or an open database connectivity (open database connectivity, ODBC) interface. The message communication service 240 provides a low-latency and high-bandwidth communication capability, and may be used for communication between microservice components. The component manager 230 is mainly responsible for managing a microservice component, including but not limited to component registration and deregistration, component enabling and disabling, component fault tolerance, component upgrade, component status monitoring, and the like.

(a) Component registration and deregistration: When a new service component is added, the service component needs to be registered with the component manager 230. When a service component is to be deleted, the service component needs to be deregistered with the component manager 230. The component manager 230 may maintain related metadata to record information such as a status and a deployment location of each service component. In this case, it may be ensured that the component manager 230 learns of an available service component in the system and the deployment location of each service component.

(b) Component enabling and disabling: When the system is started, the component manager 230 enables service components such as the metadata service, the self-monitoring service, and the statistics service based on a hardware configuration. In a distributed scenario, a plurality of service components of each type may be enabled (a specific quantity may be configured) as backups.

(c) Component fault tolerance: When a service component fails, the component manager 230 needs to schedule an alternative service component, to continue to perform a current assembly solution.

(d) Component upgrade: Components may be upgraded in turn. A component in a stateless state may be upgraded at any time, and a component in a stateful state can be upgraded only after a current task is completed.

(e) Component status monitoring: A running status of a service component in a running process is monitored. When a node joins or exits from a database system, the running status needs to be updated. The running status includes:

(1) Component service status: a quantity of tasks executed by each running service component and a resource use status; and (2) Component cluster status: a running service component and an available service component on each computing node, and a resource use status of each computing node.

Further, the component manager 230 further determines one or more service component execution paths (referred to as an "execution path" below) based on a system resource, for example, generates TOP-N optimal component execution paths. Each component execution path indicates a plurality of microservice components that are to be executed sequentially. The microservice components that are to be executed sequentially form a complete database management system that can be executed in an end-to-end manner. Microservice components on the execution path may be deployed on different computing nodes.

Figure 5:
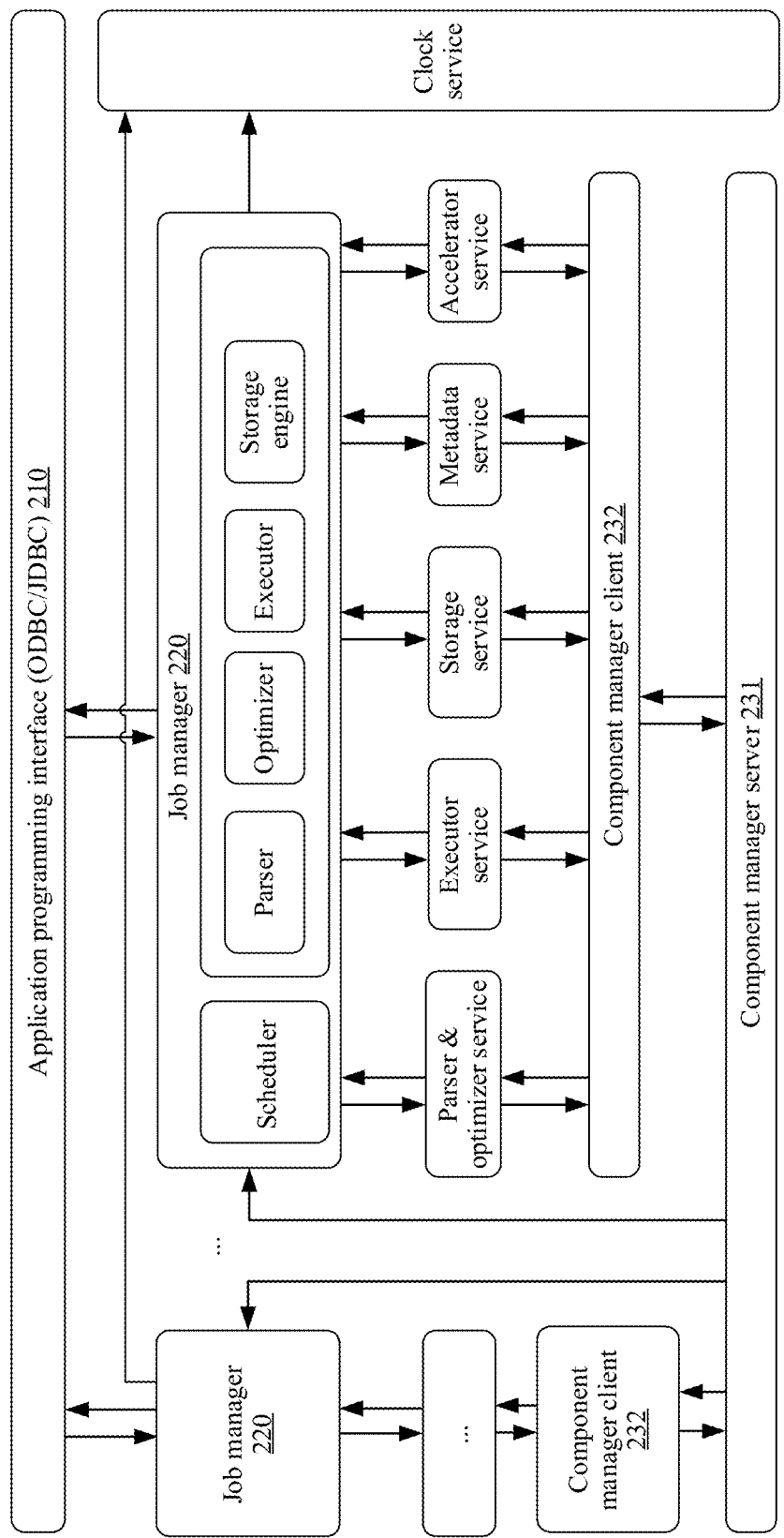
FIG. 5 is a schematic diagram of a working procedure of a database management system according to an embodiment of this application.

In an embodiment, as shown in FIG. 5, the component manager 230 includes one component manager server 231 and a plurality of component manager clients 232, and each component manager client is deployed on a single computing node (a physical machine or a virtual machine), to implement functions such as component registration, component deregistration, component enabling and disabling, component resource management, and component upgrade on the node. In the entire database management system, a plurality of component managers, for example, three component managers, may be used as backups.

In an embodiment, the job manager 220 includes a scheduler 221, selects, based on a user request from the client such as a query, an optimal execution path from an execution path provided by the component manager server 231, and schedules a service component based on the optimal execution path, to perform corresponding processing. When an error occurs in a microservice component on the execution path, the scheduler 221 schedules an alternative execution path to continue to execute a current user request, thereby improving database service availability.

Figure 6A:
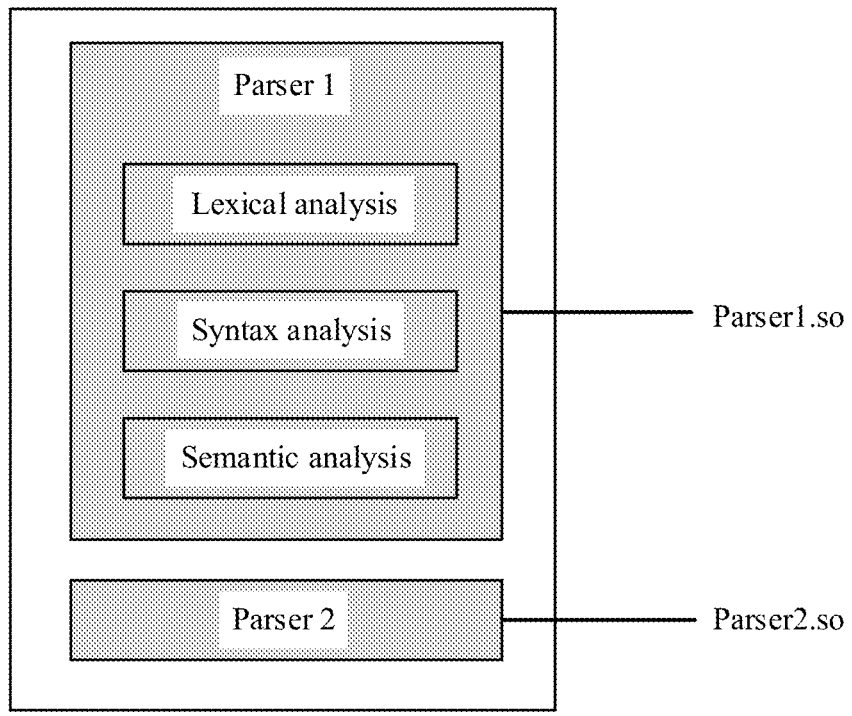
FIG. 6A is a schematic diagram of a process of dynamically loading a microservice component according to an embodiment of this application.
Figure 6B:
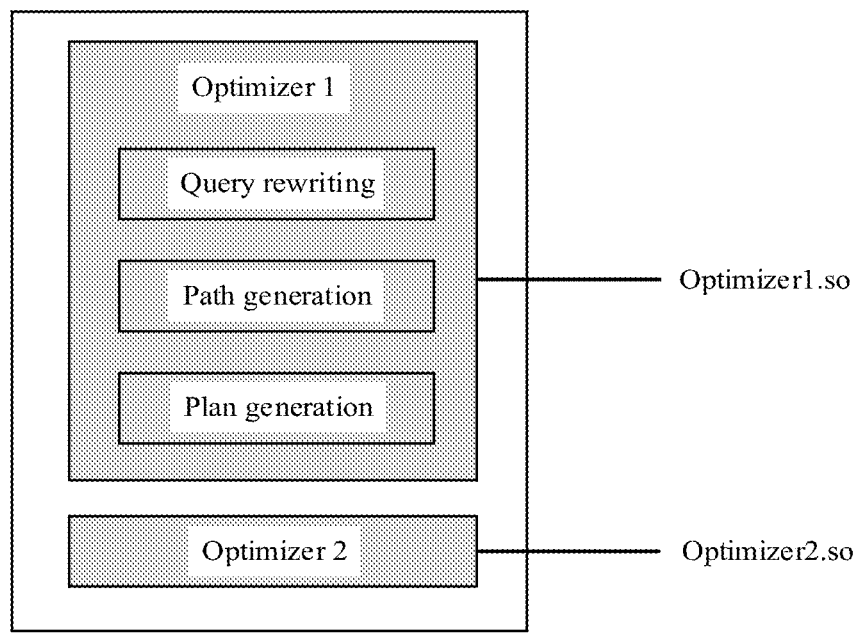
FIG. 6B is a schematic diagram of a process of dynamically loading a microservice component according to an embodiment of this application.

In an embodiment, the microservice component may be dynamically loaded in a form of a dynamic link library. For example, in a process of executing one microservice component, one or more other microservice components that exist in a form of a dynamic link library may be dynamically loaded, as shown in FIG. 6A and FIG. 6B.

In an embodiment, as shown in FIG. 2 and FIG. 5, the job manager 220 may also be embedded with service components such as a parser 224, an optimizer 225, an executor 226, and a storage engine 227. The scheduler 221 may invoke a service component embedded in the job manager 220, or may invoke an external service component of the job manager 220, for example, the parser and optimizer combination service 262 and the executor service 280. A remote procedure call (remote procedure call, RPC) manner may be used to invoke the external service component.

Figure 8:
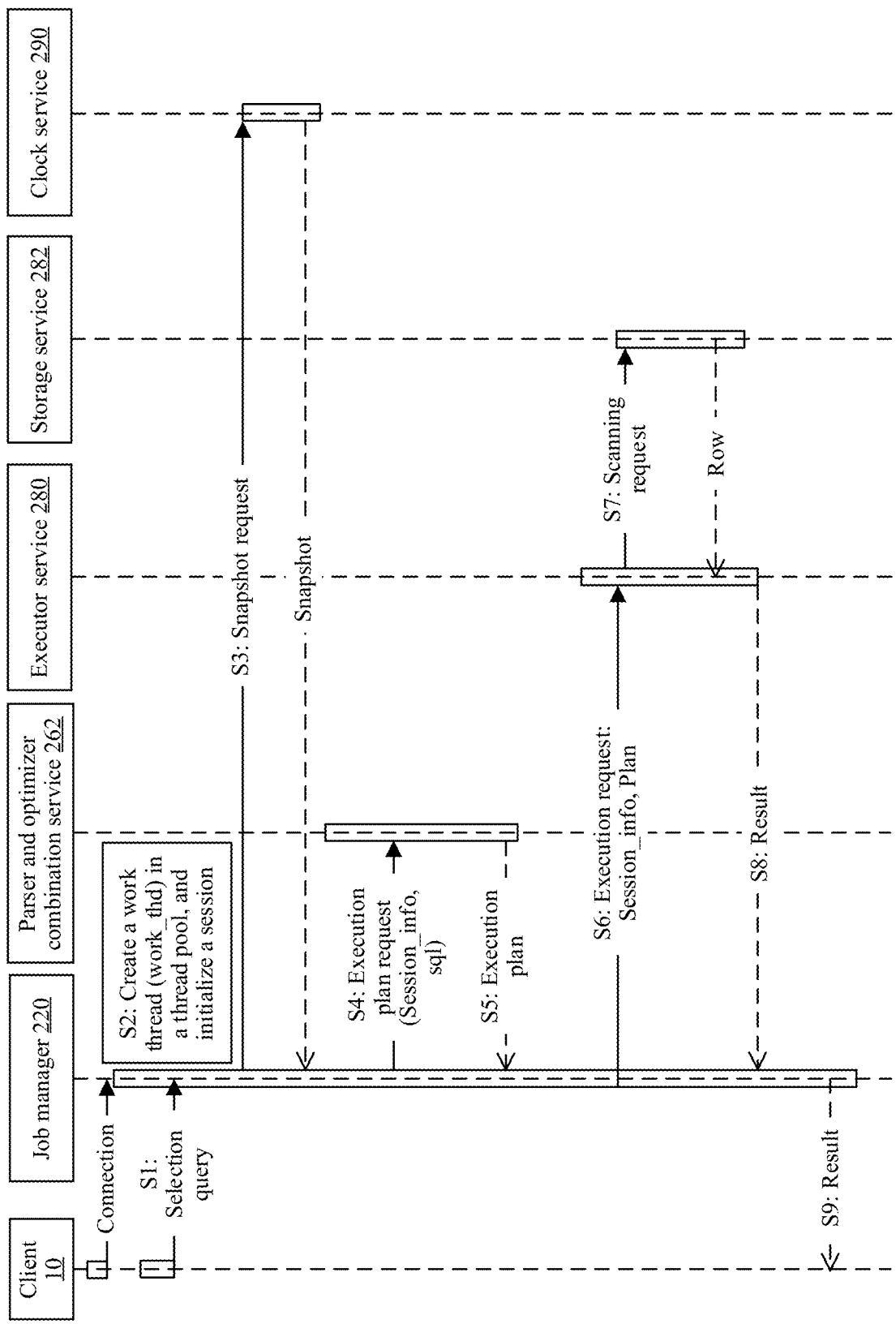
FIG. 8 is a flowchart of processing a user query by a database management system according to an embodiment of this application.

FIG. 8 shows a process in which the job manager 220 schedules different execution paths for different user requests. For a user request 1 (OLAP load), an execution path is as follows:

| Parser service | Optimizer service | Executor service | Message communication service | Storage engine service |
|---|---|---|---|---|
| Parser 1_v0 | Optimizer 2_v1 | Executor 1_v0 | TCP | Data store 2_v1 |

For a user request 2 (OLTP load), an execution path is as follows:

| Parser service | Optimizer service | Executor service | Message communication service | Storage engine service |
|---|---|---|---|---|
| Parser 3_v0 | Optimizer 3_v0 | Executor 2_v0 | RDMA | Data store 3_v0 |

It may be learned that, for both the user requests 1 and 2, the job manager 220 invokes service components such as a parser, an optimizer, and an executor, but for different requests, the job manager 220 respectively invokes microservice components deployed on different nodes, to process the requests. In other words, execution paths are not exactly the same.

An embodiment in which the component manager 230 determines a service component execution path is described below. Specifically, there are mainly three stages:

(1) Self-assembly offline learning (initial adjustment): Usually, at a database test stage, a query, load, and data are vectorized based on various known typical scenarios (data and load required for various scenarios are generated by using a generative adversarial network (GAN) technology), Top-N optimal paths are obtained through learning, and an optimal control theory is used to implement the initial adjustment of self-assembly. In other words, the Top-N execution paths are selected for each scenario (for example, a finance scenario or a cloud scenario) and recommended to the user.

(2) Self-assembly and deployment learning (fine adjustment): is usually used at a database generation stage. Top-3 execution paths are obtained through refined learning from Top-N assembly solutions based on actual data and an actual scenario of the user.

(3) Self-assembly online learning (micro adjustment): Top-3 solutions are performed in turn online based on a user running scenario, and fine adjustment is performed on the Top-3 solutions to obtain an optimal assembly solution (execution path).

It may be understood that the component manager 230 does not necessarily fully implement the foregoing three stages. For example, only the foregoing stages (1) and (2) may be implemented, or only the stage (1) may be implemented.

In an embodiment, the component manager 230 may determine a plurality of execution paths, including the optimal execution path and the alternative execution path.

In an embodiment, the following interfaces may be defined to implement communication between service components:

| Interface name | Interface type | Involved service components | Function |
|---|---|---|---|
| request_parse_sql | Message communication | Job manager and parser service | Requests an SQL parsing tree |
| send_parse_tree | Message communication | Job manager and parser service | Sends an SQL parsing tree |
| request_generate_plan | Message communication | Job manager and optimizer service | Requests to generate an execution plan based on a parsing tree |
| send_plan | Message communication | Job manager and optimizer service | Sends an execution plan |
| request_execute_plan | Message communication | Job manager and executor service | Requests to run based on an execution plan |
| request_scan | Message communication | Executor service and storage engine service | Request to scan data |
| request_metadata | Message communication | Parser service, optimizer service, and metadata service | Requests metadata |
| get_global_timestamp | Message communication | Clock service, storage engine service, and job manager | Obtains a global timestamp |
| send_msg | Message communication | Message communication service and another service component | Sends a message |
| recv_msg | Message communication | Message communication service and another service component | Receives a message |
| send_query_result | Message communication | Executor service and job manager | Sends a query result |
| request_global_snapshot | Message communication | Job manager and clock service | Sends a global snapshot request |
| Session | Data structure | Job manager, parser service, optimizer service, executor service, and storage engine service | Session data structure that reserves a session-related transaction snapshot, a transaction status, an SQL cursor, and a handle for communication with each service component |

Figure 7:
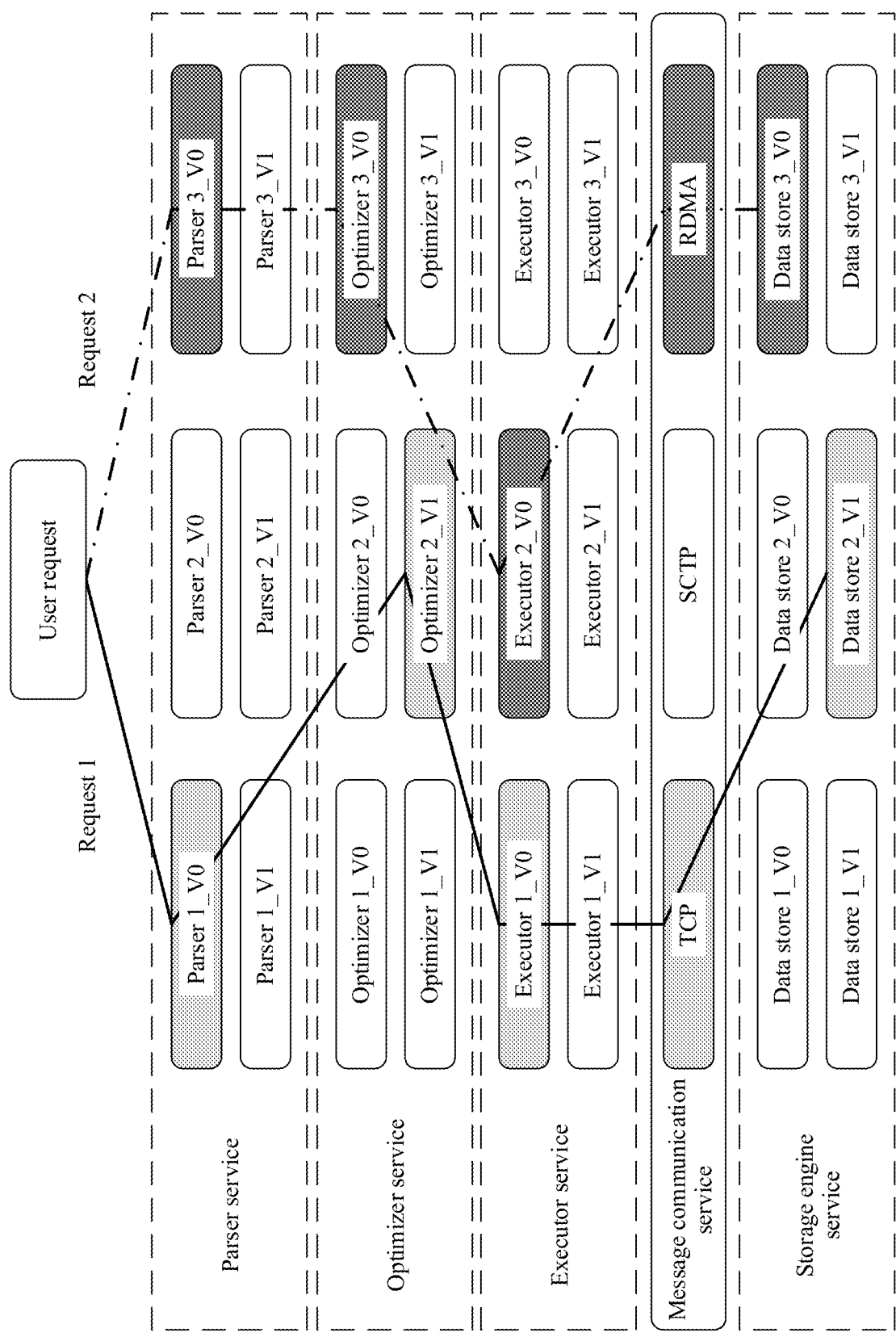
FIG. 7 is a schematic diagram of a component execution path according to an embodiment of this application.

Based on the foregoing defined interfaces, a process in which the job manager 220 schedules a microservice component to process a user request is shown in FIG. 7. In FIG. 8, a processing procedure after the client 10 establishes a connection to the job manager 220 includes the following steps.

Step S1: The client submits a user request to the job manager 220. For example, the client 10 initiates a selection query.

Step S2: The job manager 220 creates a work thread (work_thd), and initializes a session (session).

Step S3: The work thread (work_thd) of the job manager 220 sends a snapshot (snapshot) request to the clock service 290, to obtain a snapshot.

Step S4: The job manager 220 sends an execution plan request to the parser and optimizer combination service 262 based on an optimal execution path, where the request carries session information (session info) and user request information, for example, a query statement.

Step S5: The parser and optimizer combination service 262 generates an execution plan based on the query, and returns the execution plan to the job manager 220.

Step S6: The job manager 220 sends an execution request to an executor service 280, where the execution request includes the session information and the execution plan.

Step S7: The executor service 280 invokes, based on the execution plan, an operator for processing, for example, invokes a scan (scan) operator, where the scan operator sends a scanning request to a storage service 282, to obtain a specific data row in a data store.

Step S8: The executor service 280 returns a query result to the job manager 220.

Step S9: The job manager 220 returns the query result to the client 10.

Figure 9:
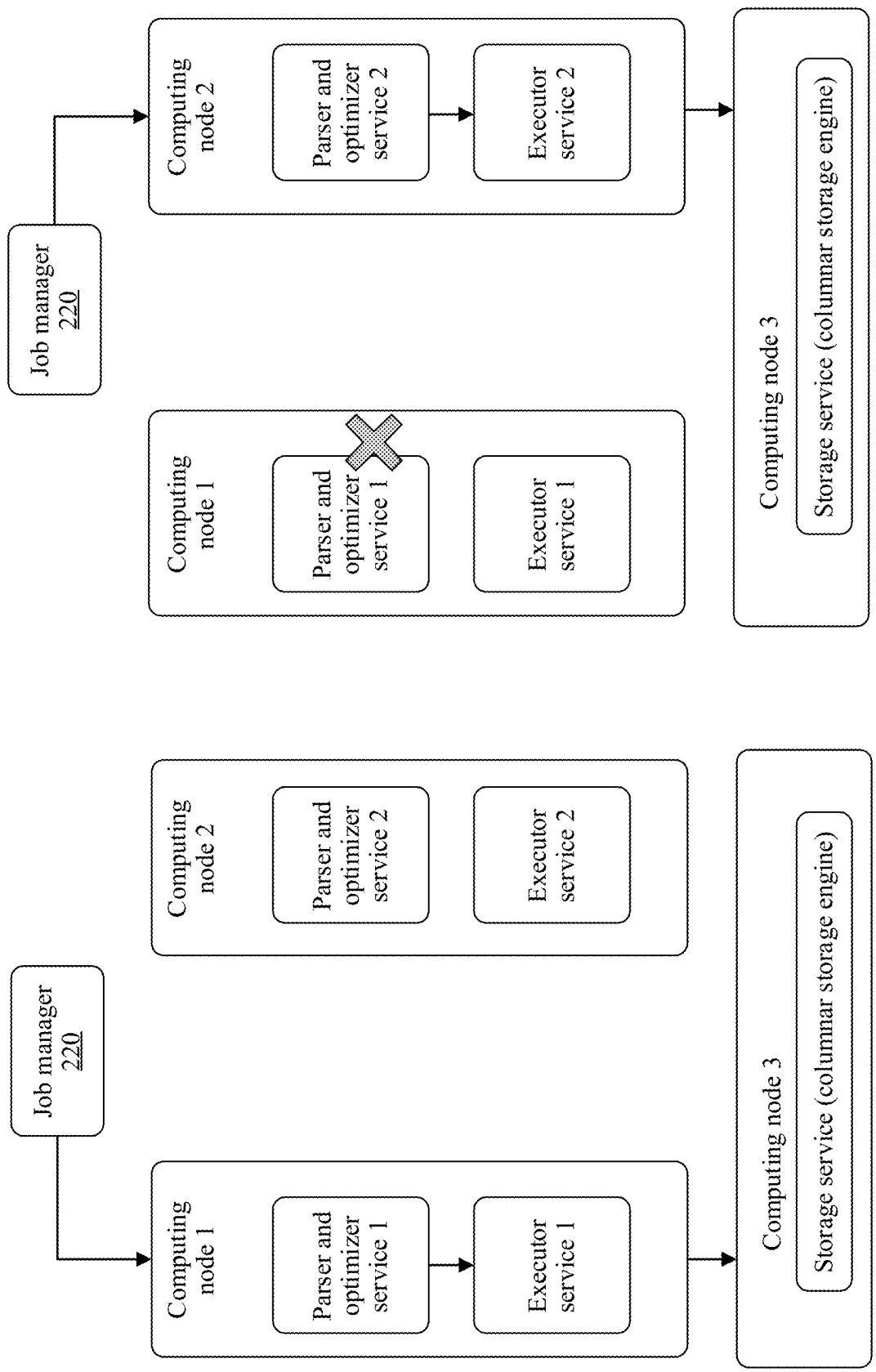
FIG. 9 is a schematic diagram of multipath execution according to an embodiment of this application.

In an embodiment, when an execution path is invoked to process a user query, if an error or a fault occurs in a service component on the execution path, error information is reported to the job manager 220, and the job manager 220 selects, based on an error type, another alternative execution path for execution. Specifically, as shown in FIG. 9, it is assumed that an optimal execution path determined by a component manager 230 is: parser and optimizer service 1→executor service 1→storage engine service 1. The parser and optimizer service 1 and the executor service 1 are deployed on a computing node 1. When the job manager 220 invokes the execution path to process the user request, if the parser and optimizer service 1 is faulty, the component manager 230 determines, based on this fault that an alternative execution path is: parser and optimizer service 2→executor service 2→storage engine service 1. The parser and optimizer service 2 and the executor service 2 are deployed on a computing node 2. The job manager 220 further invokes corresponding service components based on the alternate execution path to continue to process the user request.

Figure 10:
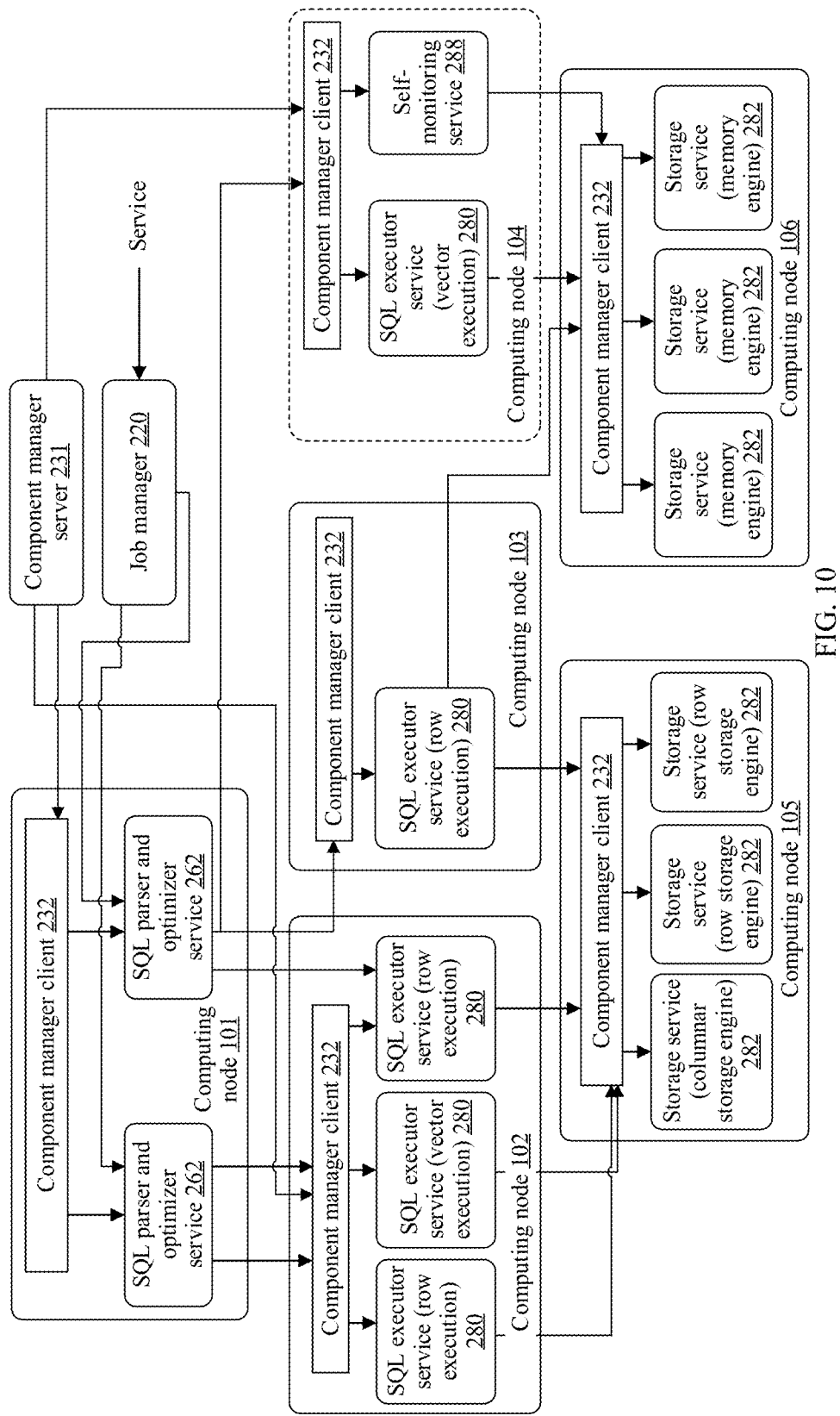
FIG. 10 is a schematic diagram of adjusting a microservice component based on service load according to an embodiment of this application.

A service corresponds to different load sizes in different time periods, and there is a traffic peak and trough. Therefore, a microservice component needs to be automatically assembled and adjusted based on a service load status, to meet different service load requirements. FIG. 9 shows a process of automatically adjusting a microservice component based on service load. As shown in FIG. 10, in this embodiment, some service components are divided at a finer granularity. For example, the executor service 280 is divided into a row execution (row execution) service and a vector execution (vector execution) service. The storage engine service 282 is divided into a row storage engine, a columnar storage engine, and a memory engine at a finer granularity. Service components are deployed on a plurality of computing nodes in a distributed manner, for example, computing nodes 101 to 106 in FIG. 10. One or more service components are deployed on each computing node, and one component manager client 232 is deployed to manage the service component on the node. The job manager 220 receives a plurality of query requests, and invokes a corresponding service component on each computing node based on an execution path determined by a component manager server 231 and by using the component manager client 232, to perform service processing. When a service peak arrives, if the component manager server 231 determines, based on service monitoring information, that computing is a bottleneck in the current system, the component manager server 231 determines, based on a hardware configuration of an idle computing node 104 (it is assumed herein that an idle node includes a GPU), a microservice component that needs to be enabled on the idle node, including an SQL executor service 280 and a GPU acceleration service 298. The component manager server 231 requests a component manager client 232 on the idle node 104 to enable the SQL executor service and the GPU acceleration service. The idle node 104 enables the SQL executor service 280 and the GPU acceleration service 298, to deal with the service peak. The idle computing node 104 may be a node whose load is lower than a preset value, or may be a newly added node.

Figure 11:
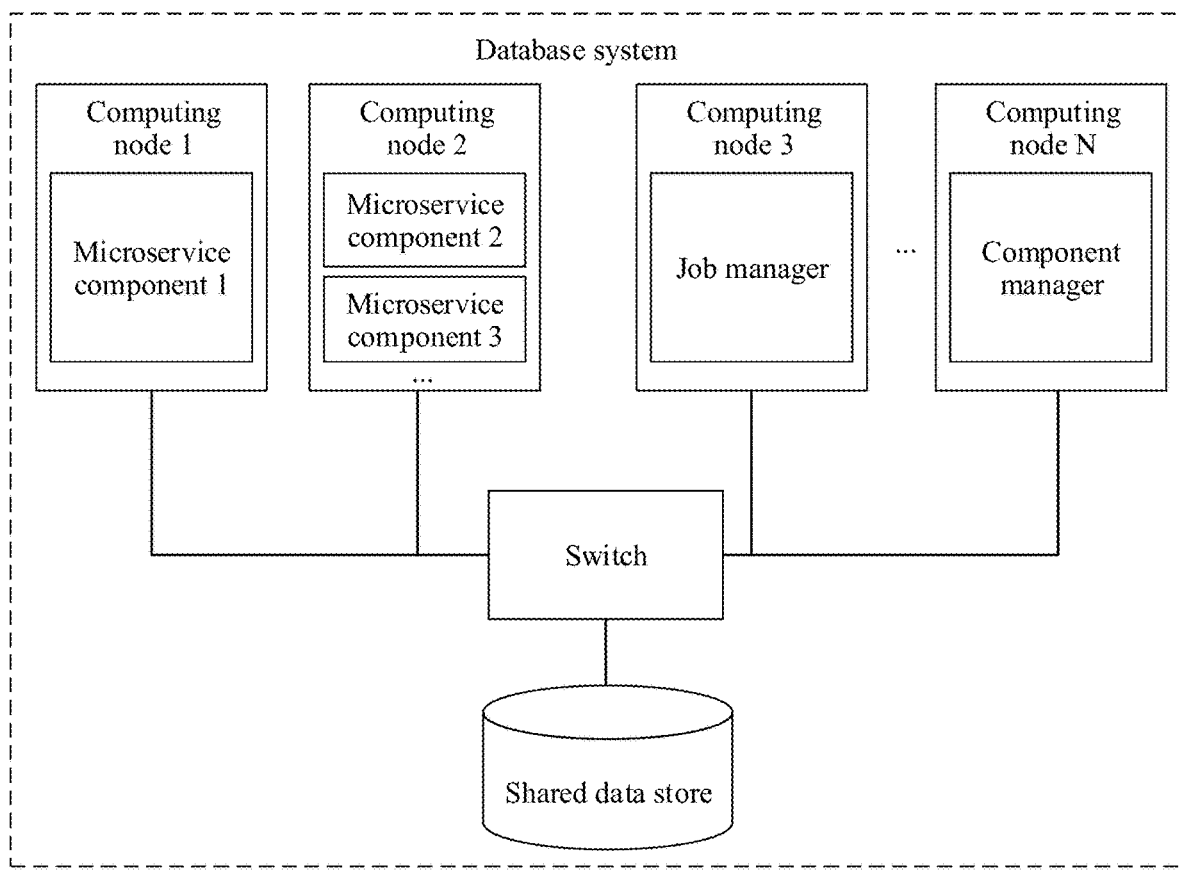
FIG. 11 is a schematic diagram of a database system according to an embodiment of this application.
Figure 12:
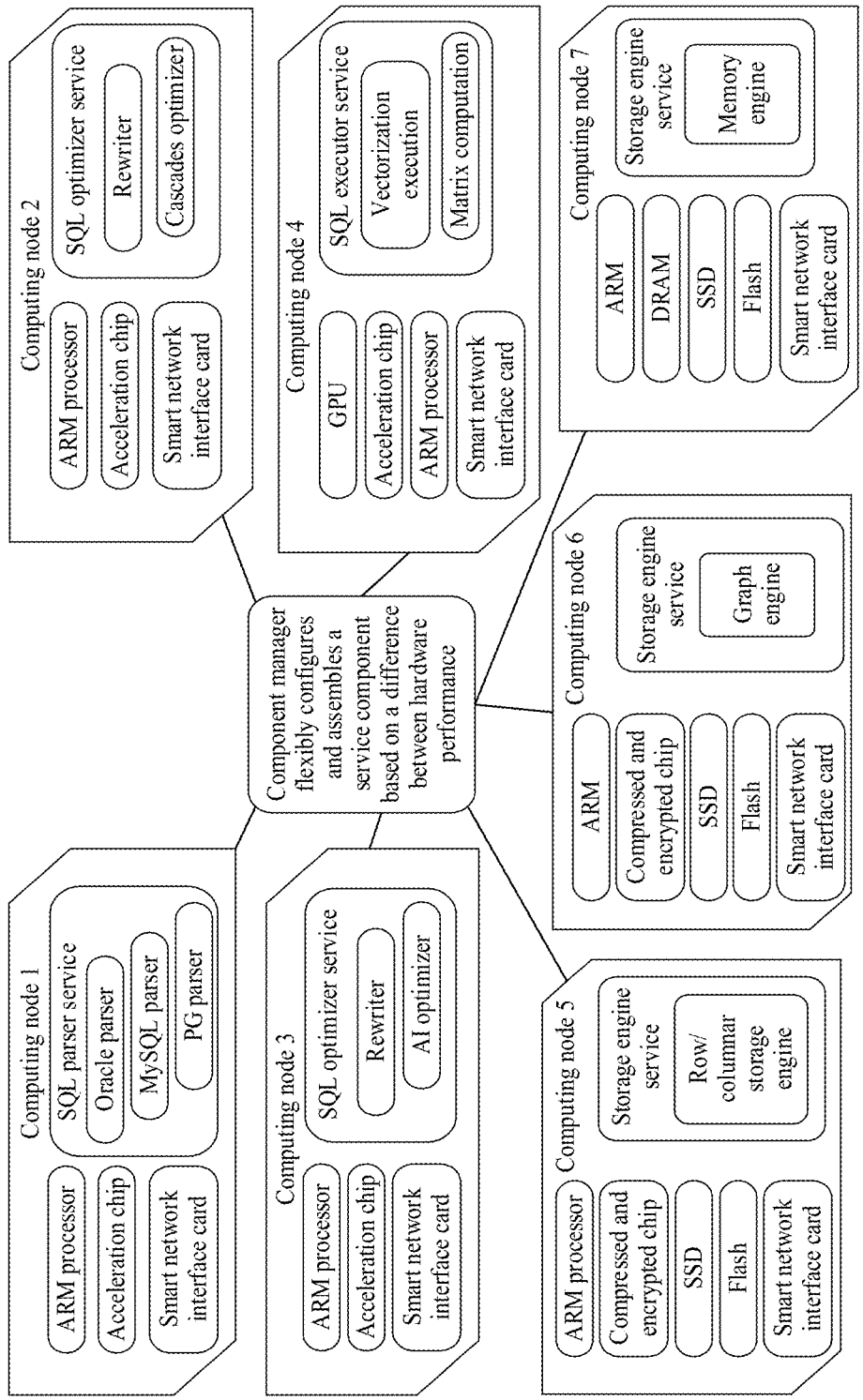
FIG. 12 is a schematic diagram of a process of configuring a microservice component according to an embodiment of this application.

FIG. 11 is a schematic diagram of a database system according to an embodiment of this application. The database system is a cluster database system in which a shared disk (shared disk) architecture is used, and includes a plurality of computing nodes (for example, nodes 1-N in FIG. 11). One or more database microservice components are deployed on each node, for example, the parser service, the optimizer service, the executor service, the storage engine service, the metadata service, the statistics service, the self-monitoring service, and the clock service in the foregoing embodiments. A plurality of microservice components that are to be scheduled and executed in a specific sequence form an execution path, to implement functions of a database management system and provide a user with services such as data querying and modification. A component manager is used to manage all microservice components in the system. Specifically, the component manager is responsible for registering and deregistering a microservice component, and maintaining metadata of the microservice component. The metadata includes but is not limited to information about a currently available microservice component in the database system and a deployment location of each microservice component (for example, an ID of a computing node on which the microservice component is located). The component manager may further configure one or more microservice components on each computing node according to a rule configured by the user, as shown in FIG. 12. Based on a resource difference between computing nodes in a heterogeneous hardware environment, the component manager can configure different microservice components to fully use respective hardware advantages of the computing nodes. For example, an SQL executor service based on vectorization execution and matrix computation is configured on a computing node with a GPU.

Further, the component manager may generate one or more execution paths based on an available microservice component in the system. For example, the component manager may generate an optimal execution path and a suboptimal execution path, or generate TOP-N execution paths. The suboptimal execution path is used as an alternative path. Correspondingly, a job manager receives a query submitted by a client, invokes a plurality of database microservice components based on the optimal execution path generated by the component manager, to process the query to obtain a query result, and then returns the query result to the client. When an error occurs in a microservice component on the optimal execution path, a plurality of microservice components are invoked based on the alternative execution path, to process the query.

In an embodiment, when load of a microservice component in the system is high, for example, when a quantity of tasks executed by the microservice component exceeds a specified threshold, the component manager may enable one or more backups of the microservice component on an idle computing node. The backup of the microservice component can be considered as an instance of the microservice component, and has a same function as the microservice component. The job manager invokes the backup of the microservice component to share the load of the microservice component, to improve system availability. That is, the component manager may dynamically adjust the microservice component based on the load in the system, and adjust the execution path.

In an embodiment, computing nodes communicate with each other through an InfiniBand (InfiniBand) network. A shared data store stores shared data that can be accessed by a plurality of computing nodes. The computing node performs a read/write operation on the data in the shared data store by using a switch. The shared data store may be a shared disk array, cloud storage, or the like. The computing node may be a physical machine, for example, a database server, or may be a virtual machine running on an abstract hardware resource. If the node is a physical machine, the switch is a storage area network (storage area network, SAN) switch, an Ethernet switch, a fibre channel switch, or another physical switch device. If the node is a virtual machine, the switch is a virtual switch.

Figure 13:
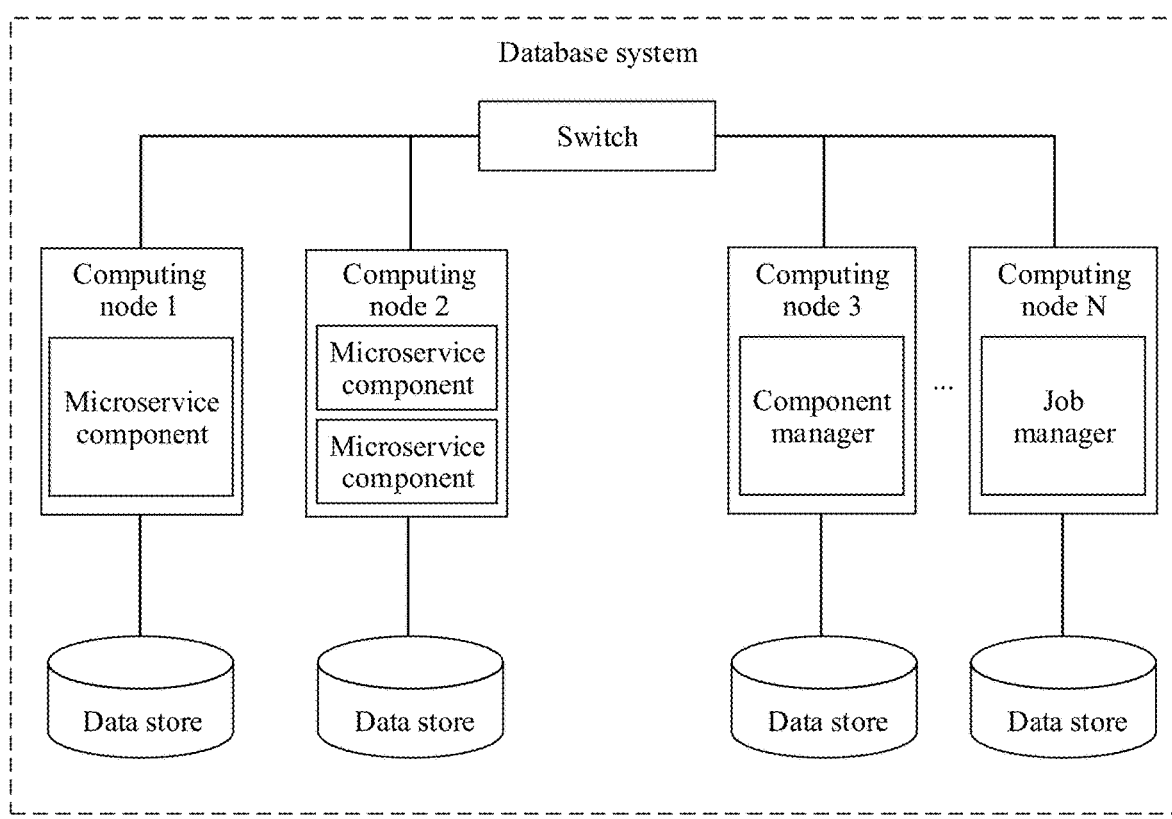
FIG. 13 is a schematic diagram of a database system according to an embodiment of this application.

FIG. 13 is a schematic diagram of a cluster database system in which a shared-nothing (shared-nothing) architecture is used. In FIG. 13, each computing node has a hardware resource (for example, a data store), an operating system, and a database that are exclusive to the computing node, and the nodes communicate with each other through a high-speed network. In this architecture, data is distributed to the nodes based on a database model and an application characteristic. A query task is divided into several parts, so that the parts are executed concurrently on all the nodes. All the nodes perform calculation coordinately and serve as a whole to provide a database service. All communications functions are implemented in a high-bandwidth network interconnection system. One or more database microservice components are deployed on each node, for example, the parser service, the optimizer service, the executor service, the storage engine service, the metadata service, the statistics service, the self-monitoring service, and the clock service in the foregoing embodiments. When processing a query task, each node may invoke, by using the job manager, a microservice component located on another computing node to assist in query processing. A data store (data store) includes but is not limited to a solid-state disk (SSD), a disk array, or another type of non-transitory computer readable storage medium.

Similar to the cluster database system in which the shared disk architecture is used in FIG. 11, the computing node herein may be a physical machine or may be a virtual machine.

It should be noted that, in the database systems shown in FIG. 11 and FIG. 13, for specific functions and working procedures of the microservice component, the job manager, and the component manager, refer to the foregoing related embodiments. Details are not described herein again.

A person skilled in the art may understand that a database system may include fewer or more components than those shown in FIG. 11 and FIG. 13, or include components different from those shown in FIG. 11 and FIG. 13. FIG. 11 and FIG. 13 show only components more related to an implementation disclosed in the embodiments of this application. For example, although four computing nodes are described in FIG. 11 and FIG. 13, a person skilled in the art may understand that the cluster database system may include any quantity of nodes. Functions of a database management system on each node may be implemented by using an appropriate combination of software, hardware, and/or firmware on the node.

A person of ordinary skill in the art may be aware that, with reference to the examples described in the embodiments disclosed in this specification, units and algorithm steps may be implemented by using hardware or a combination of computer software and hardware. Whether the functions are performed by using hardware or software depends on particular applications and design constraint conditions of the technical solutions. A person skilled in the art may use different methods to implement the described functions for each specific application.

What is claimed is:

1. A database system, comprising:
a plurality of computing nodes, a job manager, and a component manager, wherein at least one microservice component is deployed, respectively, on each of the computing nodes, and each microservice component is operable to implement a subfunction of a database management system;
wherein:
the component manager is operable to:
determine at least one execution path, wherein each execution path indicates a plurality of microservice components that are to be executed sequentially, wherein the at least one execution path comprises an optimal execution path and an alternative execution path, and wherein the component manager is operable to determine the optimal execution path through at least one of machine learning, self-assembly and deployment learning or self-assembled online learning; and
determine a plurality of combinations of microservice components based on the optimal execution path, wherein each of the plurality of combinations of microservice components comprises at least two of the following services: a parser service, an optimizer service, an executor service, a storage engine service, a metadata service, a statistics service, a self-monitoring service, or a clock service; and
the job manager is operable to:
receive a query submitted by a client;
invoke the plurality of microservice components in a first combination of microservice components in response to the query based on the optimal execution path determined by the component manager to process the query;
when an error occurs in a microservice component in the optimal execution path, invoke the plurality of microservice components in a second combination of microservice components in response to the query based on the alternative execution path determined by the component manager to process the query, to obtain a query result; and return the query result to the client.

2. The database system according to claim 1, wherein the component manager is further operable to maintain metadata of the microservice components, and the metadata comprises information about a currently available microservice component in the database system and a deployment location of each of the microservice components.

3. The database system according to claim 1, wherein the plurality of computing nodes are operable to communicate with each other through an InfiniBand network.

4. The database system according to claim 1, wherein at least one virtual machine or container runs on each of the plurality of computing nodes, and one or more microservice components are deployed on each of the at least one virtual machine or container.

5. The database system according to claim 1, wherein the at least one execution path comprises a first execution path and a second execution path, and the job manager is operable to: invoke the plurality of microservice components based on the first execution path to process the query, and when an error occurs in a microservice component in the first execution path, invoke the plurality of microservice components based on the second execution path, to process the query to obtain the query result.

6. The database system according to claim 1, wherein the component manager is further operable to monitor a running status of each microservice component in the database system, wherein the running status comprises load information of the microservice component.

7. The database system according to claim 6, wherein the component manager is further operable to: initiate a backup of a first microservice component on an idle computing node in response to determining that a load of the first microservice component in the database system exceeds a specified threshold, and generate a new execution path, wherein the new execution path comprises the backup of the first microservice component, and the first microservice component has a same function as the backup of the first microservice component.

8. The database system according to claim 1, wherein the component manager is operable to determine the at least one execution path according to a rule configured by a user.

9. The database system according to claim 1 wherein the component manager is operable to determine the execution path for the plurality of microservice components and to maintain metadata for status of each of the microservice components.

10. A method for providing a database service, the method comprising:
deploying a plurality of microservice components on a plurality of computing nodes, wherein at least one of the microservice components is deployed on each of the computing nodes, and each of the microservice components is operable to implement a subfunction of a database management system;
determining at least one execution path, wherein each execution path indicates a plurality of microservice components that are to be executed sequentially, wherein the at least one execution path comprises an optimal execution path and an alternative execution path, and wherein the optimal execution path is determined through at least one of machine learning, self-assembly and deployment learning, or self-assembled online learning; and determining a plurality of combinations of microservice components based on the optimal execution path, wherein each of the plurality of combinations of microservice components comprises at least two of the following services: a parser service, an optimizer service, an executor service, a storage engine service, a metadata service, a statistics service, a self-monitoring service, or a clock service;
receiving a query submitted by a client;
invoking the plurality of microservice components in a first combination of microservice components in response to the query based on the optimal execution path to process the query;
when an error occurs in a microservice component in the optimal execution path, invoke the plurality of microservice components in a second combination of microservice components in response to the query based on the alternative execution path determined by the component manager to process the query to obtain a query result; and
returning the query result to the client.

11. The method according to claim 10, further comprising:
updating metadata of the microservice components in response to a component registration request, wherein the metadata comprises information about a currently available microservice component in a database system and a deployment location of each microservice component.

12. The method according to claim 10, wherein at least one virtual machine or container runs on each of the plurality of computing nodes, and the deploying a plurality of microservice components on a plurality of computing nodes comprises: deploying one or more microservice components in each of the at least one virtual machine or container.

13. The method according to claim 10, wherein the at least one execution path comprises a first execution path and a second execution path, and the invoking the plurality of microservice components based on the determined at least one execution path to process the query comprises:
invoking the plurality of microservice components based on the first execution path to process the query; and
in response to determining an error occurred occurs in a microservice component in the first execution path, invoking the plurality of microservice components based on the second execution path, to process the query to obtain the query result.

14. The method according to claim 10, further comprising:
initiating a backup of a first microservice component on an idle computing node in response to determining that a load of the first microservice component in the plurality of microservice components exceeds a specified threshold, and
generating a new execution path, wherein the new execution path comprises the backup of the first microservice component, and the first microservice component has a same function as the backup of the first microservice component.

15. The method according to claim 10, further including:
monitoring a running status of each microservice component in the database system, wherein the running status comprises load information of the microservice component.

16. The method according to claim 10, further including:
determining the at least one execution path according to a rule configured by a user.

17. The method according to claim 10 wherein the plurality of computing nodes communicate with each other through an InfiniBand network.

* * * * *